United States Patent [19]

Gyllinder

[11] 4,007,021

[45] Feb. 8, 1977

[54] METHOD OF AND DEVICE FOR DRYING COMPRESSED GASES, ESPECIALLY COMPRESSED AIR FOR BRAKE SYSTEMS IN MOTOR VEHICLES

[75] Inventor: Lars Anders Gustaf Gyllinder, Norrahammar, Sweden

[73] Assignee: Svenska Luftkompressor AB, Norrahammar, Sweden

[22] Filed: May 8, 1975

[21] Appl. No.: 575,499

[30] Foreign Application Priority Data

May 14, 1974 United Kingdom .............. 21169/74

[52] U.S. Cl. ........................................ 55/33; 55/62
[51] Int. Cl.² ........................................ B01D 53/04
[58] Field of Search ................ 55/33, 163, 387, 34, 55/62

[56] References Cited
UNITED STATES PATENTS

| | | | |
|---|---|---|---|
| 2,535,902 | 12/1950 | Dailey, Jr. .............................. | 55/33 |
| 2,944,627 | 7/1960 | Skarstrom .............................. | 55/33 |
| 3,160,486 | 12/1964 | Busch, Jr. ............................. | 55/33 X |
| 3,237,377 | 3/1966 | Skarstrom ............................. | 55/33 X |
| 3,490,201 | 1/1970 | Colvin et al. ......................... | 55/34 X |
| 3,643,402 | 2/1972 | Wireman ............................... | 55/33 |
| 3,659,399 | 5/1972 | Kauer, Jr. et al. ..................... | 55/33 |
| 3,778,967 | 12/1973 | Kauer, Jr. et al. ..................... | 55/33 X |

Primary Examiner—Frank A. Spear, Jr.
Assistant Examiner—Robert H. Spitzer
Attorney, Agent, or Firm—Dorfman, Herrell and Skillman

[57] ABSTRACT

Method and apparatus for drying compressed air, for example the compressed air from a compressor in the braking system of automotive vehicles. The apparatus comprises a pair of drying chambers having a regeneratable drying medium therein and connections for causing compressed air to flow alternatively through the two chambers. The apparatus provides a system in which the compressed air is directed through one of the chambers into a receiver for storage or use. A portion of the dried air from the outlet of the first chamber is caused to flow through the second chamber to drive out the moisture from the regeneratable drying medium. When the air pressure in the receiver reaches a maximum level, the apparatus interrupts the flow of dried air into the receiver, directs all of the compressed air from the compressor through the second chamber and directs all of the dried air from the outlet of the second chamber through the first chamber to regenerate the same.

5 Claims, 4 Drawing Figures

METHOD OF AND DEVICE FOR DRYING COMPRESSED GASES, ESPECIALLY COMPRESSED AIR FOR BRAKE SYSTEMS IN MOTOR VEHICLES

This invention relates to a method of and apparatus for drying compressed gases.

It is known for compressed gases to be dried by conducting them through a treatment chamber containing a regeneratable drying medium, which adsorbs and/or absorbs moisture.

Conventionally there are provided two treatment chambers, each of which alternates between a first or operating condition wherein the medium therein is drying gases and a second or regenerating condition wherein the operating medium is being regenerated. Upon having passed through the chamber in the first condition air from a compressor is in a dry state. A main part, say about 90% of the regenerating dry air stream is used or stored while a minor part is led through the chamber for regenerating the medium therein by drying it. After passing through the regenerating chamber the air is discharged to atmosphere. After regeneration of a chamber, the flow of gas is passed over to that chamber with the regenerated drying medium, while the other chamber is regenerated.

In another known system one treatment chamber is provided and a regeneration-air-container is connected to the dry air outlet therefrom and is filled with a supply of dry compressed air while this is produced. When the drying medium is saturated with moisture, one or more valves are operated to cut off the air supply to the treatment chamber and the air stored in said regeneration-air-container is released to pass through the treatment chamber and thus regenerate the drying medium in it. Thereupon the cycle is started again by reversal of the valves.

All these previously known methods and apparatuses suffer from the disadvantage that only a small part (for example up to 50%) of the loading capacity of the compressor can be used. Further they are expensive to construct.

An object of the invention is to provide an improved method of and an improved apparatus for drying compressed gases.

With this object in mind, the present invention provides a method of drying compressed gases, for example compressed air for a motor vehicle braking system comprising passing the compressed gases through a first treatment chamber containing a regeneratable drying medium, diverting a minor part of the dried air to pass through a second treatment chamber for regenerating drying medium therein, the two chambers being alternatively connected to a supply, and, when said first chamber is disconnected from the supply, causing the whole of the dried air from the outlet of the second chamber to pass through the first chamber to effect rapid regeneration of its contents.

The invention also provides apparatus for drying compressed gases, for example compressed air for a motor vehicle braking system, comprising first and second treatment chambers containing a regeneratable drying medium, a valve arrangement for supplying air from a compressor to the chambers alternately, a by-pass for diverting a minor part of the dried air from an outlet of one of the chambers to the other chamber for regenerating the contents thereof and means operative, upon actuation of said valve to direct the supply to the second chamber, to cause the whole of the dried air issuing from the second chamber to be passed through the first chamber to rapidly regenerate its contents.

The invention will be described further, by way of example, with reference to the accompanying drawings, in which.

Figure 1:
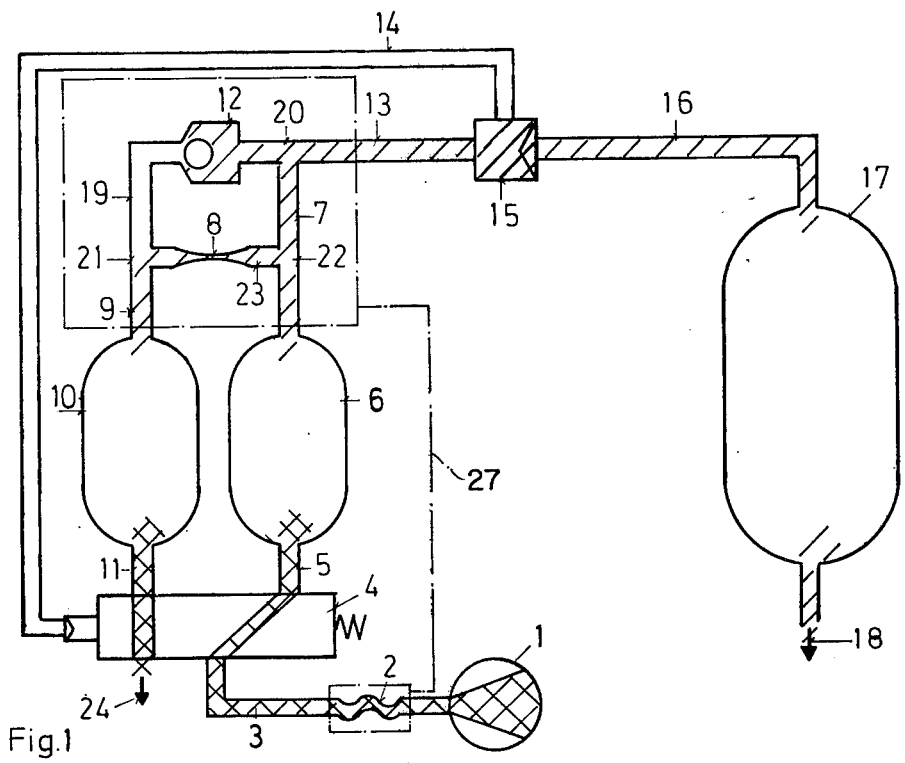
FIG. 1 is a schematic representation of a preferred embodiment of apparatus conforming to the present invention illustrating a drying stage in the operating cycle during which air is being dried and conducted on to storage and/or for consumption.

For better understanding, in the drawings wet air streams are symbolised with crossed lines, dry air streams with hatching, and actuating air streams with black and white rectangular fields.

A compressor 1 produces compressed air, which passes into a pipe 3 which is preferably coiled and/or reduced in diameter at 2 (i.e. in the vicinity of the compressor). In this way the air can be cooled and the degree of cooling predetermined by choosing the dimensions of the part 2.

Pipe 3 leads to a preferred embodiment of apparatus conforming to the invention and having a 2/2-way valve 4, operated by an actuating stream of air which can flow along a pipe 14 (to be described later).

Beyond the valve 4 the main air stream continues through a pipe 5 leading into a first treatment chamber 6 containing a drying medium of known type. The main air stream leaves chamber 6, in a dry condition and enters into a pipe 7, the end of which remote from chamber 6 branches at tee 20 into pipes 13 and 19. The pipe 19 incorporates a non-return one-way valve 12 permitting flow only in the direction of said tee 20 and leads to a second tee 21, which joins a short circuit or by-pass pipe 23 having a throttling member 8. The pipe 23 connects to pipe 7 at a tee 22. A pipe 9 is a continuation of pipe 19 and constitutes an outlet from a second treatment chamber 10 having the same medium as chamber 6. The inlet passage 11 of the chamber 10 leads from said valve 4 and in the illustrated condition of FIG. 1 is connected to atmosphere at 24.

In a second condition in which the material in chamber 6 is being regenerated (FIG. 2) pipes 3 and 11 are interconnected via the valve 4. As apparent from the drawing, the valve 4 simultaneously reverses the flow of both the main air stream and the wet-air-stream from chamber 10, which will be described in greater detail below.

The pipe 13 conducts the main stream of dry air to a control valve 15, to which is connected a passage 16 leading to e.g. a storage container 17 and therefrom to places of use as at 18.

From the control valve 15 the pipe 14 leads to the valve 4.

In use compressed air is fed by the compressor 1 through pipes 2, 3 and to 5 into the first treatment chamber 6, wherefrom the main undivided and dried stream enters into the pipe 7 and onto pipe 13 and control valve 15, into pipe 16 and therefrom to storage 17 and/or directly to places of use. Simultaneously a minor quantity of dry air is diverted from pipe 7 at tee 22 for passing through pipe 23 and throttling member 3 into the second treatment chamber 10, wherefrom the moisture-absorbing dry air stream continues as a wet air stream through 11 and 4 into the open air at 24. The saturated drying medium of said second treatment chamber 10 thus will be regenerated.

Figure 2:
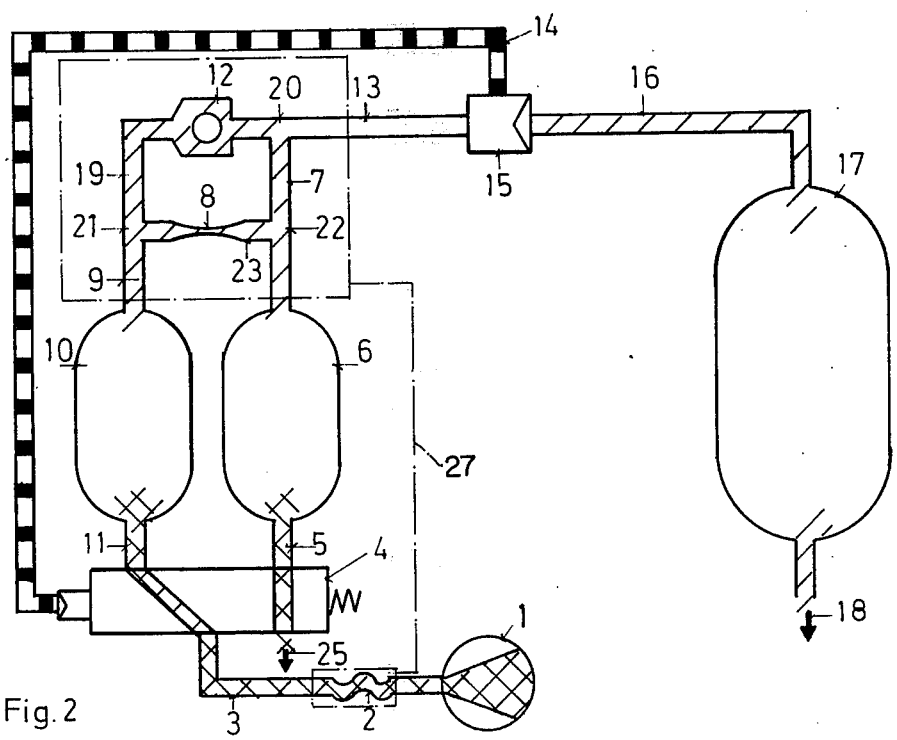
FIG. 2 is a view similar to that of FIG. 1 but illustrating a regenerative stage of the operating cycle.

When the demand for air is filled, for example when a certain pressure is reached in the storage container 17, the control valve 15 shuts off pipe 16 from the main air streams, but interconnects 13 and 14, so that actuating air is produced, which reverses valve 4 (FIG. 2). Upon this reversing pipe 3 and 11 are interconnected, so that the wet main air stream reaches the second treatment chamber 10 undivided. There it becomes dried and passes into 7 via 9, 21 and 23 with 8 as a minor stream, but also into 7 via 19 with 12, which is opening, and 20 as a broad or main dry stream. The shut-off valve 15 and the reversed valve 4 prevent flow into 13. At 22 both streams join each other to form an undivided dry air stream passing through the first treatment chamber 6 and thus regenerating its drying medium. The so formed wet air streams passes through 5 and 4 and into the open air at 25.

Upon pressure drop at either 16, 17 or 18 below a certain level, which may be adjusted at valve 15, the actuating air is evacuated from passage 14, so that valve 4 reverses again to reinstate the conditions according to FIG. 1.

The second treatment chamber, which is regenerated under normal conditions of consumption, serves, in connection with other features, to massively and quickly regenerate the first treatment chamber. In this way up to approximately 80% of the loading capacity of a compressor can be utilised, which is an enormous improvement compared with previously known devices allowing a utilisation of compressor capacity up to about 50% only.

The above-described specific embodiment and its details are to be considered only as non-restrictive examples, and many variations are possible within the scope of the following claims.

Figure 3:
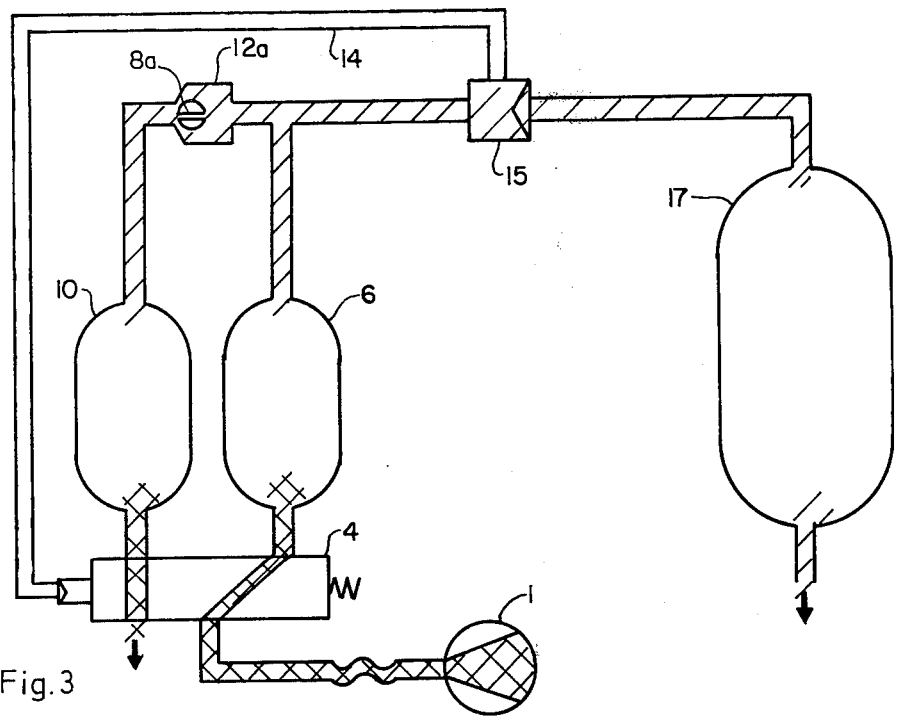
FIG. 3 is a view similar to that of FIG. 1, but of a second embodiment.

For example the throttling passage or the like 8 and the non-return valve 12 can be combined in a minimum-return one-way valve 12a having a throttling member 8a permitting a minimum return as a by-pass means to do the same service (FIG. 3). This eliminates the need for the tees 21 and 22, the by-pass 23 and the orifice 8. In other respects, the elements of FIG. 3 are the same as in FIGS. 1 and 2.

Furthermore pipe 9 or parts 8/12, pipe 7 or some other part of the apparatus may be heated in order to improve the regenerative capacity of chambers 10 and 6 in the respective cycle. A suitable source of heat is the coiled part 2, from which heat may be derived. Such an arrangement is shown schematically by the broken lines 27 in FIGS. 1 and 2. In a preferred embodiment said coiled pipe surrounds the parts to be heated. A liquid or the like may be provided for improved heat transfer.

Figure 4:
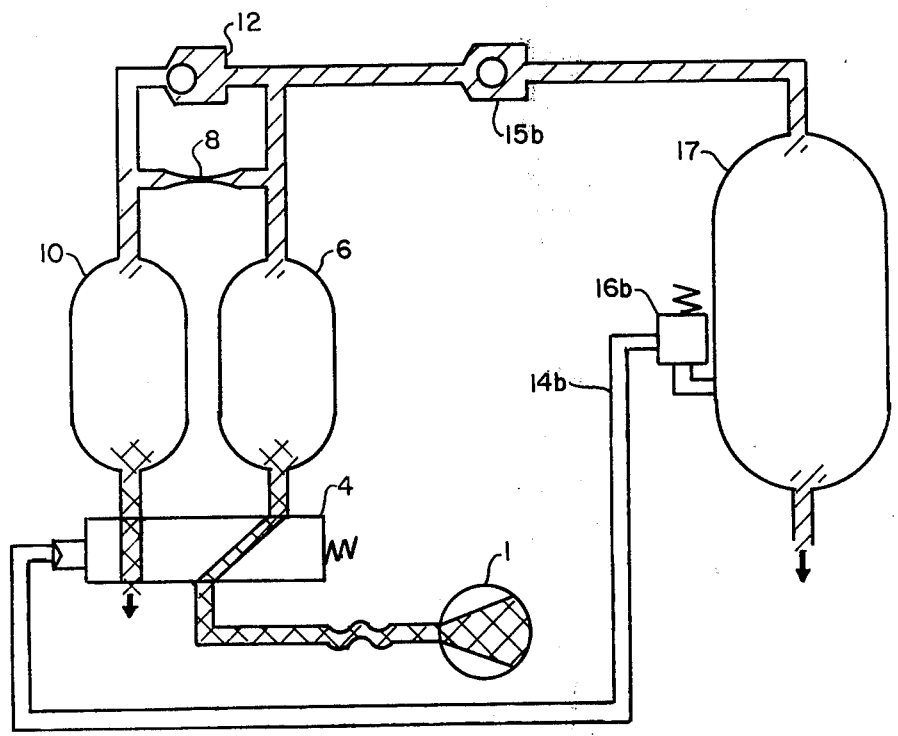
FIG. 4 is a view similar to that of FIGS. 1 and 3, but of a third embodiment.

The control valve 15 may be replaced by a conventional non-return valve 15b simultaneously as actuating air is derived from a control valve 16b arranged downstream of said non-return valve 15b and connected to the valve 4 by a pipe 14b (FIG. 4). In other respects, the elements of FIG. 4 are the same as in FIGS. 1 and 2.

Control means for distributing the air stream between the two treatment chambers preferably is in accordance with British Patent No. 1224929.

What we claim is:

1. A method of drying compressed gases in a treatment system having two treatment chambers, an inlet supply for moist compressed gas and an outlet valve for useful dried compressed gas, each of said treatment chambers having a regeneratable drying medium therein, comprising passing all of the gas from the inlet supply through one of said treatment chambers to dry the gas, diverting a minor part of the dried gas from said one chamber through the other chamber to regenerate the drying medium therein and exhausting the spent gas from said other chamber, thereafter interrupting the discharge of the dried gas through the outlet valve and during said interruption supplying moist compressed gas through said inlet supply, disconnecting the said one chamber from the inlet supply, connecting said other chamber to the inlet supply to dry the gas, diverting all of the dried gas from said other chamber through said one chamber to obtain maximum regeneration of the drying medium therein and exhausting the spent gas, and thereafter reconnecting the inlet supply to said one drying chamber when discharge of useful dried gas from said one chamber through the outlet valve is resumed.

2. A method as claimed in claim 1 wherein said outlet part of the treatment system includes a storage device for the useful dried gas connected to said outlet valve, including the step of taking control air from the outlet part of the system and wherein connecting the chambers to the inlet supply is effected by a 2/2-way valve actuatable by the control air.

3. A method as claimed in claim 2 wherein disconnection of the first chamber from the inlet supply is effected when the pressure in the outlet storage device exceeds a predetermined value.

4. A method as claimed in claim 1 including the step of heating the dried air to aid regeneration.

5. A method according to claim 4 wherein said inlet supply is connected to a compressor through a heat-exchange device, and wherein further heat from the compressed gas from the compressor is used to heat the dried air.

* * * * *